UNITED STATES PATENT OFFICE.

CHESTER E. ANDREWS, OF PITTSBURGH, PENNSYLVANIA, ASSIGNOR TO THE SELDEN COMPANY, OF PITTSBURGH, PENNSYLVANIA, A CORPORATION OF DELAWARE.

CYMENE DYESTUFF AND PROCESS OF MAKING SAME.

1,314,921.      Specification of Letters Patent.      Patented Sept. 2, 1919.

No Drawing.      Application filed September 14, 1917. Serial No. 191,482.

*To all whom it may concern:*

Be it known that I, CHESTER E. ANDREWS, a citizen of the United States, residing at Pittsburgh, in the county of Allegheny and State of Pennsylvania, have invented certain new and useful Improvements in Cymene Dyestuffs and Processes of Making Same, of which the following is a specification.

The present invention relates to the production of dyes from cymene mono amin, by first converting the same into cymene diazonium chlorid and then coupling as aromatic hydroxy compound, in an alkaline solution, whereby the alkali metal salt, for example a sodium salt of the mono amino cymene azo aromatic hydroxy body is produced.

The dyes produced, when starting with cymene mono amin (1-methyl-2-amino-4-isopropyl-benzene, or its isomer 1-methyl-3-amino-4-isopropyl-benzene) are in some respects similar to those produced by a somewhat analogous procedure, by reacting upon anilin, but the cymene dyes are in practically every instance, of a very much more brilliant and intense color, so that a smaller quantity of the dye is necessary to produce a given effect, and also by the use of these dyes, a more brilliantly colored fabric can be produced.

The first step in the operation is the diazotization of the cymene mono amin.

As a specific example of this procedure the following is given. Seven and one-half parts of the pure or crude cymene mono amin are dissolved in a mixture of 200 parts of cold water, water at ordinary room temperature being suitable, with 15 parts of hydrochloric acid of about 39% strength, and the mixture is at once cooled to 10° C. or below, in order to prevent decomposition. A solution of about three and one-half parts of sodium nitrite in 25 parts of water is then added, while the temperature is maintained at about 10° C. or below, and while stirring. This produces a solution of 1-methyl-4-isopropyl-2-diazonium chlorid.

This solution is added to a molecular equivalent of a hydroxy aromatic body. For example it may be added to 7.2 parts of betanaphthol dissolved in 150 parts of water and 8 parts of caustic soda, the solution being maintained at about 10° C. or below, and stirring the solution while mixing the solutions. The solution is then stirred, at about 10° C. or below, until the reaction is complete. This may require about two hours, more or less, depending upon the purity of the materials and other factors, such as speed of coupling, this latter in turn depending upon the particular hydroxy body used. There is thereby precipitated the sodium salt of mono amino cymene azo betanaphthol, which salt constitutes the dye produced, and is of a very brilliant reddish orange color. The precipitate is separated from the solution, for example by filtration and is then dried. This may be used to dye fabrics or yarn or other material, according to well known dyeing methods.

A modification of this process, which is in many cases advisable, is to impregnate the textile material with the solution of alkaline beta naphthol, dry the material, and then treat the impregnated textile material with the solution of cymene diazonium chlorid, so that the dye is precipitated in the fabric, with the production of a dyed material in one operation.

In the above example I have referred to beta naphthol as a suitable hydroxy aromatic body. Other hydroxy aromatic bodies can be employed, for example alpha naphthol, resorcinol, phenol or pyrogallol, or the derivatives of aromatic hydroxy bodies, particularly the sulfonic acid derivatives of naphthalene ring compounds, such as Schaeffer's acid (beta naphthol mono sulfonic acid), gamma acid (2:8-amino-naphthol-6-sulfonic acid), R-acid (beta-naphthol-3:6-disulfonic acid, chromotropic acid (1:8-dioxy-naphthalene-3:6-disulfonic acid), H-acid (1:8-amino-naphthol-3:6-disulfonic acid), K-acid (1:8-amino-naphthol-4:6 disulfonic acid), RR-acid (2:8-amino-naphthol-3:6 disulfonic acid), Neville and Winther-acid (alpha naphthol sulfonic acid-1:4), Schoelkopf's acid (alpha naphthol sulfonic acid-1:8), RG-acid (alpha naphthol 3:6-disulfonic acid), 1-naphthol-5-sulfonic acid and various others which can be coupled in alkaline solution. The colors of the various bodies will vary, depending upon what particular hydroxy body is used.

With most of the simple hydroxy bodies, the sodium salt produced constituting the dye, is insoluble, whereas with the sulfonic acid compounds the sodium salt constituting the dye is in most cases soluble. Those dyes which are soluble, produced in accordance with this invention, can readily be separated from the solution by the customary method of "salting out".

Although I have described the diazotization of the mono amino cymene and the coupling of the diazonium compound with beta naphthol somewhat in detail, I do not wish to limit myself to the exact conditions set forth, for I realize that these may need changing slightly to allow a more economical commercial production and it will be obviously advisable to employ different proportions when using the other hydroxyl derivatives of the aromatic hydrocarbons to be used as the second component of the dyestuffs.

I claim:

1. A dyestuff containing the radical

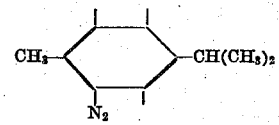

said dyestuff being of a more brilliant color than the corresponding dyestuff containing the group

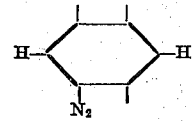

2. A dyestuff comprising a salt of the compound diazo-cymene coupled with a hydroxy derivative of an aromatic hydrocarbon.

3. A salt of cymene-azo-betanaphthol, being insoluble in water and of a brilliant reddish orange color, and capable of dyeing fabrics a brilliant reddish orange color.

In testimony whereof I affix my signature.

CHESTER E. ANDREWS.